United States Patent [19]

Yamamoto et al.

[11] 3,981,840

[45] Sept. 21, 1976

[54] METHOD FOR MOLDING THERMOPLASTIC RESIN COMPOSITIONS

[75] Inventors: Sadanori Yamamoto; Isao Osada, both of Hirakata, Japan

[73] Assignee: Joto Chemical Company Limited, Japan

[22] Filed: Mar. 13, 1974

[21] Appl. No.: 450,797

Related U.S. Application Data

[63] Continuation-in-part of Ser. No. 257,720, May 30, 1972, abandoned.

[30] Foreign Application Priority Data

June 3, 1971 Japan................................ 46-38230

[52] U.S. Cl................................. 260/42; 260/37 N
[51] Int. Cl.².......................................... C08K 9/00
[58] Field of Search................ 260/42, 42.17, 42.18, 260/37 N

[56] References Cited

UNITED STATES PATENTS

| | | | |
|---|---|---|---|
| 3,422,053 | 1/1969 | Henderson | 260/33.6 AQ |
| 3,498,872 | 3/1970 | Sterman | 260/37 N |
| 3,644,271 | 2/1972 | Tulley | 260/37 N |

*Primary Examiner*—Paul R. Michl
*Attorney, Agent, or Firm*—McGlew and Tuttle

[57] ABSTRACT

A process is provided for the manufacture of shaped articles by molding a thermoplastic resin and filler. The process comprises mixing a thermoplastic resin with a filler preheated to a temperature at which the filler will have an amount of heat sufficient for heating the resin to its melting point and which is 50° to 200°C higher than the same melting point, and subjecting the mixture to molding into articles of desired forms and sizes. Various sorts of molding machines can be used, and the manufacturing costs are low.

7 Claims, No Drawings

3,981,840

METHOD FOR MOLDING THERMOPLASTIC RESIN COMPOSITIONS

CROSS REFERENCE TO OTHER APPLICATION

The present application is a continuation-in-part of application Ser. No. 257,720 filed May 30, 1972 now abandoned.

BACKGROUND OF THE INVENTION

1. Field of the Invention

The present invention relates to a process for molding a thermoplastic resin incorporated with a large amount of an inorganic filler.

2. Prior Art

It has been known that artificial stones can be made by pressing and heating a mixture consisting of a large amount of finely divided stones with the fluid prepolymer of a thermosetting resin, such as for example, unsaturated polyester resin, epoxy resin and melamine resin. It is also known that such such stones are made by heating and curing a similar mixture in which finely divided stones have been uniformly dispersed in the liquid prepolymer. For example, in this case, the stones are dispersed by shaking, or by pouring the fluid prepolymer into spaces between finely divided stones and then curing same.

In these conventional methods of preparing artificial stones, the curing by polymerization of the thermosetting resin takes a great deal of time and also a lot of labor is required to pour the molding material into a metal mold and take out the molded objects. Moreover, what is worse in those conventional prior art methods, when the slightest mistake is committed in conditioning, the molding material tends to have air bubbles in it or crack, graze and shrink during curing. This makes it difficult to produce standardized products.

Studies have been conducted on the method of mass producing artificial stones and other shaped articles by using thermoplastic resin, instead of thermosetting resins, by means of an extruder. However, no satisfactory results have been obtained as yet.

Since the thermoplastic resin material used for the foregoing purposes is generally in the form of powders or pellets, an intimate mixture would hardly be made sufficiently and with a large quantity of an added inorganic filler by mere heat and pressure. Moreover, any molding machine fed with such a composition often becomes unworkable. Furthermore, even if this composition works, it cannot give a product of superior quality. For example, if a mixture of polyethylene pellets with finely divided stones is put into a metal mold, pressed with heat and then cooled, a molded product of mediocre quality will be obtained; but, because of the poor intimacy of the mixture of the resin with the filler material, the texture of the product would not be good enough. If finer pieces of broken rocks are employed, the degree of intimacy of the mixture of the resin with the filler material would be somewhat improved, but there will still be unevenness in the permeation of the resin material into spaces between the pieces of rocks. Thus, products having a fine texture would not be obtained with the filler uniformly distributed. The same will be the case even when varied kinds of resin are used.

Further, when the molding composition is applied to an ordinary extruder whose cylinder and metal mold have been well heated, the machine will be overloaded and become unworkable in a short time after start of the operation. This will be due to the lack of lubricity of the filler and the fact that the resin does not melt sufficiently. In order to overcome these defects, it has been proposed to heat the mixture of resin pellets and the filler in a separate preheating vessel, and then feed them to the extruding machine. In this case, however, if the preheat temperature is no higher than the melting point of the resin itself, the extruding machine would become overloaded also in a similar manner as stated above. On the other hand, if the preheating temperature is made as high as about the melting point of the resin, the resin pellets will become fused with each other by the slightest mixing movements in the preheating vessel. Thus, it would become difficult for the material to be poured into the extruder; if poured with force, the molding material tends to adhere closely to the screw between the feeding and compression zones, leaving the machine running in idle. Only when the preheating temperature is made a little higher than the melting point of the resin, the extruder will remain workable for some time, but thereafter the amounts being extruded become gradually smaller, until at last the resin is fused to the screw, making the operation of the extruding machine entirely impossible. Thus, no satisfactory results may be given in any of these cases.

OBJECTS OF THE INVENTION

An object of the present invention is to provide a process for mixing a thermoplastic resin in intimate conditions with a large amount of an inorganic filler.

Another object of the invention is to provide a molding process which makes it possible for a molding machine, such as an extruding or injection-molding machine, to be operated continuously, even when large amounts of filler are used for mixing with the thermoplastic resin.

Still another object of the invention is to provide a process for continuously producing shaped articles in large quantities at low costs by employing a variety of molding machines, such as extruders, injection-molding machines, and calender rolls attached to and cooperative with kneading rolls.

The above-given and other objects of the present invention are attained by adopting a method which is characterized by adding, to thermoplastic resin powders or pellets, an inorganic filler which has been preheated to a temperature at which the filler will have an amount of heat sufficient for heating the resin ingredient to its melting point and which is about 50° to about 200°C higher than the melting point of the resin, in as large an amount as about 0.5 to 1.5 times the true volume of the resin, compressing and kneading them, and by molding the resultant mixture.

DESCRIPTION OF THE INVENTION

To give a more detailed description of the invention, the resins employed are for example selected from the group consisting of polystyrene, polyethylene, polypropylene, polyvinyl chloride, polyamide, AS resins, and ABS resins and waste plastics thereof. Other thermoplastic resins, useful in practicing the invention have a comparatively high thermal stability and a low viscosity when molten, although the invention is not limited thereto.

The inorganic fillers are exemplified by limestone, granite, andesite, and other stones, all finely divided, and calcium carbonate, silica, clay, asbestos, gypsum, alumina, cement, and glass, in the form of granule or powder, and cinders, slag, and sludge.

In practicing the process of the invention, other additives such as coloring agents or stabilizers are employed, if desired or necessary. It is preferred to have the fillers treated with a suitable dispersing agent or a lubricant, such as surface active agent, wax, lead stearate or a thermosetting resin, for example, epoxy resin and unsaturated polyester resin, in order to improve the intimacy of the mixture of filler with the thermoplastic resin.

The gist of the present invention lies in preheating the inorganic filler to a temperature at which the filler will have an amount of heat sufficient for heating the resin ingredient to its melting point and, at the same time, about 50° - 200°C higher than the melting point of the resin prior to mixing, and then shifting the mixture of resin and filler to the compression-kneading process. Here, there is established the following relation between the temperature at which the filler is preheated:

$$W_1 C_1 (T_M - T_1) = W_2 C_2 (T_2 - T_M),$$

where $W_1$ and $W_2$ are the weight of the resin and the filler, respectively, $C_1$ and $C_2$ are the specific heat of the resin and the filler, respectively, $T_1$ and $T_2$ are the temperature of the resin and the filler preheated, respectively, and $T_M$ is the melting point of the resin.

In the above-mentioned equation, the preheat temperature of filler, $T_2$, is equivalent to the amount of heat owned by the filler which is required to heat the resin up to its (the resin's) melting point. In other words, $T_2$ is understood to be a minimum temperature at which the filler should be preheated, because the filler-resin molding composition is usually kneaded at a temperature fairly higher than the melting point of the resin, say, by 50° to 100°C or more, and in order to cause the resin to be heated to above its melting point, the filler is required to have been preheated higher than the value of $T_2$ in the equation. For the accomplishment of the invention, it is necessary to determine the preheat temperature of the filler at a temperature such that the amount of heat owned by the preheated filler is enough for heating the resin to above its melting point, such temperature always being higher than the value of $T_2$ in the equation.

Further, it has been discovered that desirble results can be obtained when the preheat temperature of filler is in the range of from about 50° to 200°C higher than the melting point of the filler. When the preheat temperature of filler is under the lowest limit, the resin would not be sufficiently molten. On the other hand, when it is above the highest limit, there is the possibility of causing deterioration to the resin. The most suitable preheat temperature of the filler depends upon the kind of the filler and the resin used and also upon their mixing ratios; however, it can be determined based on the above-mentioned equation by a person skilled in the art.

According to a preferred embodiment of the invention, the resin is also preheated to a moderate temperature so that it may be molten more easily. Such preheat temperature of resin is preferably below its melting point. When it is too high, resin particles would be molten to each other to form lumps and, as a result, the tumbling of the resin ingredient with the filler would become difficult and no smooth, continuous supply of the molding mixture to an extruder would be carried out. In the case of the resin preheated, the preheat temperature of filler is lowered accordingly, as is determined by the above-mentioned equation.

According to the invention, the ratio by true volume of the thermoplastic resin to the filler which are to be mixed with each other, varies between about 1:0.5 and about 1:1.5. This is so because it has been found that if the volume of the filler is below 50% of that of the resin, the finished product from such a composition would not possess desirable properties. Likewise, if said volume exceeds 150%, the molten resin would not become intimate with the filler, and the moldability of the compression-kneaded mixture would be deteriorated.

Now, for the purpose of bringing about a better understanding of the invention, an illustration of embodiments using an extruder machine will be given below.

Certain resin pellets and fillers are preheated under the conditions described above and lightly mixed with each other before they are fed to an extruder. The preheated fillers melt the surface of the resin pellets which have been somewhat melted, so that each pellet is entirely covered with some of the fillers. The filler-covered pellets, then mixing with the remaining filler, are supplied to the feed zone of the extruder. The composition thus fed then proceeds to the compression zone, with only the filler itself coming in contact with the surfaces of the machine parts. At the compression zone, the filler components penetrate into the resin pellets and as the heat of the filler spreads to the resin components, the whole composition is converted all at once into the melted state, and well kneaded. The composition then enters into the melting zone and becomes a uniform melt, which is extruded from the die. In the process, it is observed that the cylinder should be heated only at the beginning of the operation of the machine, for, during the later operation, the heat given off by the filler itself and the frictional heat caused by mixing the filler with the resin will be enough. The surfaces of the cylinder may be kept cool by means of a fan or the like. Under such conditions, there can be no sticking of the resin to the surfaces of the screw, and no reduction in quantities of the composition extruded.

To explain the circumstances, speaking of the three temperatures, viz., the temperature of the screw, that of the resin, and that of the cylinder, the first is highest in the part other than the feed zone, and the third lowest. The screw temperature is higher than the other since it is imparted by the preheated filler and the frictional heat, and also the screw itself permits little heat escape. It is generally said that resins are apt to adhere to highly heated metals, but this is true only when the metal surfaces coming in contact with the resin are considered. Actually, the resin in contact with highly heated metals is of low viscosity, while that coming in contact with little heated metals is of high viscosity. Consequently, when the revolving or shearing power is working, the surfaces of the screw have a low frictional resistance, and that of the cylinder has a high frictional resistance, giving an ideal condition under which a sufficient propulsion is given to the mixture.

The process of the present invention is applicable not only to extruders but also to other molding machines.

Taking an example with kneaders, the prescribed amounts of a resin and a filler, having been heated to $T_1$ and $T_2$, respectively, with $T_M$ a little higher than in the case of an extruder, were fed to one which had been preheated a little higher than $T_M$, and there was obtained a uniform melt in a short time. Under different preheating conditions, however, the resin alone adhered to the walls of the heated instrument, failing to give a uniform mixture, although it took a longer time to complete the process.

Further, as another example, a roll was employed with the resin and filler which had been treated under conditions similar to the case of the above kneader before lightly mixed so that each resin pellet was covered the the filler. In this example, the first step of operation of roll-kneading could be completed in a short time, where the resin began to adhere to the surfaces of rolls only after having absorbed the heat of the filler and melt-mixed to a considerable extent.

A variety of molded objects can be made by the process of the invention from thermoplastic resins in combination with an inorganic filler. For example, products from the combination of polyethylene and lime stone are useful for floor boards like marble; those from styrol and lime stone are used as hard artificial stones for making walls and furniture. Another example may be products from polypropylene and calcium carbonate, which are recommended as boards having appropriate rigidity and flexibility.

Next, the process of the invention will be more fully described by the following examples. It should be understood that those examples are construed as merely illustrative, and not limitative of the remainder of the specification and claims in any way whatsoever.

EXAMPLE 1.

A. Molding conditions:

(1) Composition:
   Resin:   Low pressure polyethylene pellets.
             100 parts by weight.
             Specific gravity: 0.95.
             Specific heat: 0.55.
             (Melting point: 120°C).
   Filler:  Finely divided limestone
             (Average diameter: 0.5 mm.)
             200 parts by weight.
             Specific gravity: 2.7
             Specific heat: 0.20
(2) Preheat temperatures:
   Resin: 90°C.
   Filler: About 190°C.
(3) Specification of an extruder employed:
   Diameter of the cylinder: 70 mm
   L/D of the cylinder: 20
   Compression ratio: 1:1.7
   Temperatures:  Feed zone:       140°C
                    Compression zone: 160°C
                    Melting zone:    170°C
                    Die:                 180°C
   Extruding die:  having a rectangular outlet,
                      150 mm wide and 5 mm high.

B. Molding procedure:

The extruder was operated at 20 rpm, and a melt was obtained through the metal mold 3 minutes after the start of the operation. Then, the melt became a uniform mixture and stable operation of the molding machine and was continued for about 10 minutes. During the operation, the temperatures at the compression and melting zones were lowered to 150° and 160°C, respectively, and cooling with a fan was repeated. The rpm of the machine was increased to 28, and the current from the motor was kept at 22 A. A melt of uniform quality was extruded at the rate of 1 kg per minute, or 60 kg per hour. When the melt was cooled as it went through a calendar, there was given an artificial stone with smooth surfaces, having proper rigidity and flexibility.

EXAMPLE 2.

A. Molding conditions:

(1) Composition:
   Resin:   Styrol resin GP pellets.
             100 parts by weight.
             Specific gravity: 1.05.
             Specific heat: 0.4.
             (Melting point: 110°C)
   Filler:  Finely divided limestone
             (Average diameter: 0.5 mm)
             300 parts by weight.
             Specific gravity: 2.7.
             Specific heat: 0.2.
(2) Preheat temperatures:
   Resin: 110°C.
   Filler: About 193°C.
(3) Kneader employed:
   1 Hp. Heated to 170°C with an oil-heating jacket.

B. Molding procedure:

Resin and filler were heated in separate vessels, then taken out and put into a metallic vessel. After they were tumbled lightly in the vessel with a lid on, the whole mixture was fed to a revolving kneader. In about two minutes, a melt of uniform texture was obtained. Then, some of the melt was put into a metallic vessel, preheated to 150°C and immediately cooled under pressure to obtain a beautiful artificial stone having high hardness.

EXAMPLE 3.

A. Molding conditions:
   1. Compositions: same as in Example 2.
   2. Preheat temperatures: varied as indicated in Table 1 (below)
   3. Kneader used: same as in example 2.
B. Molding procedure: same as in example 2.

In the tests of this example 3, and also of Example 4 to follow, it was also attempted to find out how the finished products were changeable quality-wise depending on any overs or shorts in the so-called "regenerative heat rates", denoted by $\eta$ in the tables, which were obtained by the following equation.

$$\eta = \frac{W_2 C_2 T_2 + W_1 C_1 T_1}{T_m (W_1 C_1 + W_2 C_2)}$$

In this equation, when $\eta$ was equal to 1, the preheating conditions were found to satisfy the equation $$W_1 C_1 (T_m - T_1) = W_2 C_2 (T_2 - T_m)$$

wherein the variables $W, C, T_m, T, W_2, C_2, T_2$, are as defined hereinabove.

TABLE 1.

| Test No. | Preheat Temperature (°C) Resin | Preheat Temperature (°C) Filler | $\eta$ | Kneading Time (Min.) | Observation on Quality of Product |
|---|---|---|---|---|---|
| 1 | 23 | 23 | 0.14 | 15 | Somewhat yellowish |
| 2 | 60 | 60 | 0.37 | 11 | " |
| 3 | 60 | 120 | 0.60 | 7 | " |
| 4 | 60 | 200 | 0.90 | 3-1/6 | Good |
| 5 | 100 | 200 | 1.00 | 2-1/6 | Good |
| 6 | 110 | 193 | 1.00 | 2 | Good |

TABLE 1.-continued

| Test No. | Preheat Temperature (°C) Resin | Filler | η | Kneading Time (Min.) | Observation on Quality of Product |
|---|---|---|---|---|---|
| 7 | 110 | 210 | 1.06 | 2 | Good |
| 8 | 23 | 252 | 1.00 | 2-1/2 | Somewhat yellowish |
| 9 | 23 | 200 | 0.80 | 3-5/6 | Good |

Note:
Tests 1, 2 and 3 fall outside the scope of the invention. (According to restriction temperature-wise of resin and filler.)

EXAMPLE 4

A. Molding conditions:

(1) Compositions: (a) As the resinuous ingredient, 100 parts by weight of tin-type stabilizer containing rigid polyvinyl chloride resin, having a specific gravity of 1.35, a specific heat of 0.25, and a melting point of about 100°C.
(b) As the filler ingredient, 200 parts by weight of finely divided limestone (average particle size: 0.5 mm in diameter) having a specific heat of 0.2.
(2) Preheat temperature: Varied as indicated in Table II (below).
(3) Kneader used: Equipped with an oil heating jacket. Capacity: 1. h.p.

B. Molding procedure: Same as in Example 3, above.

TABLE II.

| Test No. | Preheat Temperature (C°) Resin | Filler | η | Kneading Time (Min.) | Observation on Quality of Product |
|---|---|---|---|---|---|
| 10 | 20 | 20 | 0.12 | 21 | Partly decomposed |
| 11 | 60 | 60 | 0.35 | 13 | Somewhat yellowish |
| 12 | 60 | 120 | 0.62 | 9 | " |
| 13 | 80 | 200 | 0.90 | 4 | Good |
| 14 | 80 | 225 | 1.00 | 3-1/3 | Good |
| 15 | 80 | 240 | 1.05 | 3 | A little yellowish |
| 16 | 40 | 250 | 1.00 | 4 | Somewhat yellowish |
| 17 | 20 | 350 | 1.13 | — | Decomposed during kneading |

Note:
Tests 10, 11, 12 and 17 fall outside of the scope of the invention. According to the restriction temperature-wise of resin and filler.

It is evidently clear from the above Tables I and II that the preheat temperatures are critical elements which work to affect the kneading time, or the time required for kneading into an intimate uniform blend suitable for molding purposes, and the quality of resultant molded products.

EXAMPLE 5.

A. Molding conditions:

(1) Composition:
Resin: Blow molder high-pressure polyethylene plastics, crushed, about 4mm in diameter.
100 parts by weight.
Specific gravity: 0.92.
Specific heat: 0.55.
Melting point: 110°C.
Filler: Finely divided granite.
Average particle size: 0.5 mm.
200 parts by weight.
Specific gravity: 2.7.
Specific heat: 0.19
(2) Temperature at which the composition was applied to an extruder:
Resin: 23°C.
Filler: As indicated in Table III (below).
(3) Specification of the extruder:
Cylinder diameter: 70 mm
L/D of the cylinder: 20
Compression ratio: 1:2.2
Temperatures:  Feed zone:           130°C
               Compression zone:    170°C
               Melting zone:        170°C
               Die:                 200°C
Extruding die: having a rectangular outlet, 150 mm wide and 20 mm high.

B. Molding procedure:
The resin and filler at temperatures as indicated in Table III below were lightly tumbled together in a vessel and the resulting mixture was fed to the inlet hopper of the extruder. The results are shown in Table III.

TABLE III.

| Test No. | Resin | Filler | Result |
|---|---|---|---|
| 18 | 23 | 23 | * |
| 19 | 23 | 50 | * |
| 20 | 23 | 100 | * |
| 21 | 23 | 150 | * |
| 22 | 23 | 200 | ** |
| 23 | 23 | 250 | *** |

In the above table, and also in Tables IV, V and VI to follow, the asterisk marks mean as follows:
* No extrusion was available.
** Mixing was insufficient, and the extruded product had a rough surface.
*** The extruded product had a uniform, smooth surface.

In this example, the preheat temperature of the filler required for heating the resin up to its melting point was about 240°C.

EXAMPLE 6

Example 5 was repeated except the filler was glass powder, having a particle size of about 0.3 mm, a specific gravity of 2.5 and a specific heat of 0.27. The results are shown in Table IV below.

TABLE IV.

| Test No. | Preheat Temp. (°C) Resin | Filler | Result |
|---|---|---|---|
| 24 | 23 | 23 | * |
| 25 | 23 | 50 | * |
| 26 | 23 | 100 | * |
| 27 | 23 | 150 | ** |
| 28 | 23 | 200 | *** |
| 29 | 23 | 250 | *** |

In this example, the preheat temperature of the filler required for heating the resin up to its melting point was about 200°C.

EXAMPLE 7.

Example 5 was repeated except that the filler was cinders from pyrites ($SiO_2$ 7.0%, $Al_2O_3$ 1.5%, CaO 0.9%, $Fe_2O_3$ 88.7%, MgO 1.2%, S 0.7%), having a particle size of about 0.15 mm, a specific gravity of 5.2 and a specific heat of 0.15, in an amount of 300 parts by weight. The results are shown in Table V below.

TABLE V.

| Test No. | Preheat Temp. (°C) Resin | Preheat Temp. (°C) Filler | Result |
|---|---|---|---|
| 30 | 23 | 23 | * |
| 31 | 23 | 50 | * |
| 32 | 23 | 100 | * |
| 33 | 23 | 150 | * |
| 34 | 23 | 200 | ** |
| 35 | 23 | 250 | *** |

In this example, the preheat temperature of the filler required for heating the resin to its melting point was about 220°C.

EXAMPLE 8.

A. Molding conditions:

(1) Composition:
   Resin: Polypropylene, about 4.7 mm in diameter particles.
      100 parts by weight.
      Specific gravity: 0.91
      Specific heat: 0.46
      Melting point: 160°C.
   Filler: Commercially available gypsum powder.
      150 parts by weight.
      Specific gravity: 2.35.
      Specific heat: 0.3
(2) Preheat temperatures:
   Resin: 100°C
   Filler: 250°C
(3) Roll mill employed:
   Roll diameter: 300 mm
   Temperature: 210°C on the first roll and 200°C on the second roll.

B. Molding procedure:

The resin and filler lightly tumbled were fed to a two-roll mill having a clearance of 2 mm. The material dropping through the clearance was collected by a receiver and re-charged twice to the roll mill, while the mill was operated. When the rolling stock wound around the roll, the clearance was widened up to 5 mm. The movement of the rolls develop shear in the rolling stock, such shear being repeatedly fed back to the mill, to produce a uniformly blended composition. The composition thus produced was applied to a metal mold preheated at about 210°C and subjected to pressing and immediate cooling, to obtain a plate article having a smooth surface and a fine texture.

For comparison, when similar resin and filler both preheated at 100°C were applied to the same roll mill and subjected to a similar operation it failed to develop any winding around the roll and subsequent kneading effects.

EXAMPLE 9.

A. Molding conditions:

(1) Composition:
   Resin: Acrylonitrile-styrene copolymer.
      100 parts by weight.
      Specific gravity: 1.08.
      Specific heat: 0.33.
      Melting point: 100°C.
   Filler: $CaCO_3$
      250 parts by weight.
      Specific gravity: 2.6
      Specific heat: 0.28
      Apparent volume per g: 1.9 cc.
(2) Preheat temperature: Varied as indicated in Table VI.
(3) Extruder employed: Same as used in Example 5, except temperatures being as follows:
   Feed zone: 180°C.
   Compression zone: 210°C.
   Melting zone: 210°C.
   Die: 220°C.

B. Molding procedure:

Procedure identical to Example 5 was carried out. The results are shown in the following Table VI.

TABLE VI.

| Test No. | Preheat Temp. (°C) Resin | Preheat Temp. (°C) Filler | Result |
|---|---|---|---|
| 36 | 23 | 23 | * |
| 37 | 23 | 50 | * |
| 38 | 23 | 100 | * |
| 39 | 23 | 150 | *** |
| 40 | 23 | 200 | *** |
| 41 | 50 | 50 | * |
| 42 | 50 | 100 | * |
| 43 | 50 | 130 | ** |
| 44 | 50 | 160 | *** |
| 45 | 50 | 190 | *** |

In this example, the preheat temperature of the filler required for heating the resin to its melting point was about 140°C when the resin was heated at 23°C, while it was about 130°C when the resin was heated at 50°C. It should be noticed that Test No. 43 satisfies this condition, but the preheat temperature of filler is differentiated from the melting point of the resin only by 30°C, far less than 50°C.

What is claimed is:

1. Process for manufacture of shaped articles by molding a thermoplastic resin composition and a filler which comprises (1) preheating the filler to a preheating temperature at which the filler has an amount of heat sufficient for heating the resin to its melting point and which is about 50° to about 200°C higher than the melting point of the thermoplastic resin, (2) mixing and heating thermoplastic resin with the filler in a true volume ratio of resin to filler between about 1 to 0.5 and about 1 to 1.5, controlling said preheating temperature of the filler being limited to a temperature $T_2$ which is defined by the relation $W_1C_1(T_M-T_1) = W_2C_2(T_2-T_M)$ wherein $W_1$ and $W_2$ are the respective weights of resin and filler in one mixture, $C_1$ and $C_2$ are the respective specific heats of the resin and filler, $T_1$ is the temperature of the resin and $T_M$ is the melting point of the resin, and (3) subsequently kneading the resultant mixture of resin and filler under pressure, and then molding the resultant mixture to form the desired shaped article.

2. The process of claim 1, wherein said filler is an inorganic substance in the form of powder or granules.

3. The process of claim 1, wherein said thermoplastic resin is preheated to about its melting point.

4. The process according to claim 1, wherein said thermoplastic resin is a member selected from the group consisting of polystyrene, polyethylene, polypropylene, polyvinyl chloride, polyamide, AS resin, and ABS resin, and wherein said filler is an inorganic filler comprising at least one member selected from the group consisting of finely divided limestone, granite, andesite, calcium carbonate, silica, clay, asbestos, gypsum, alumina, cement and glass.

5. The process according to claim 1, wherein, after kneading under pressure, the resultant mixture is extruded to desired shape and size, cooled and recovered.

6. The process according to claim 1, wherein, after kneading under pressure, the resultant mixture is molded to the desired size and shape, cooled and recovered.

7. The process according to claim 1, wherein said thermoplastic resin is a member selected from the group consisting of polystyrene, polyethylene, polypropylene, polyvinyl chloride, polyamide, AS resin, ABS resin, and waste plastics thereof, and wherein said filler is an inorganic filler consisting essentially of at least one member selected from the group consisting of finely divided limestone, granite, andesite, calcium carbonate, silica, clay, asbestos, gypsum, alumina, cement, glass, cinders, slag, and sludge, and wherein after kneading under pressure, the resultant mixture is extruded to desired shape and size, cooled and recovered.

* * * * *